(12) United States Patent
Wang (10) Patent No.: US 12,290,972 B2
(45) Date of Patent: May 6, 2025

(54) INJECTION MOLDING MACHINE

(71) Applicant: FANUC CORPORATION, Yamanashi (JP)

(72) Inventor: Lei Wang, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 112 days.

(21) Appl. No.: 18/014,963

(22) PCT Filed: Aug. 2, 2021

(86) PCT No.: PCT/JP2021/028567
§ 371 (c)(1),
(2) Date: Jan. 6, 2023

(87) PCT Pub. No.: WO2022/030433
PCT Pub. Date: Feb. 10, 2022

(65) Prior Publication Data
US 2023/0256659 A1    Aug. 17, 2023

(30) Foreign Application Priority Data
Aug. 5, 2020  (JP) .................................. 2020-133032

(51) Int. Cl.
*B29C 45/84*    (2006.01)
*B29C 45/17*    (2006.01)

(52) U.S. Cl.
CPC ............ *B29C 45/84* (2013.01); *B29C 45/176* (2013.01); *B29C 2045/1797* (2013.01); *B29C 2045/846* (2013.01)

(58) Field of Classification Search
CPC .................. B29C 45/84; B29C 45/176; B29C 2045/1797; B29C 2045/846
(Continued)

(56) References Cited

FOREIGN PATENT DOCUMENTS

CN        105235168 A        1/2016
CN        110884038 A    *   3/2020    ............. B29C 45/17
(Continued)

OTHER PUBLICATIONS

Huber et al. (DE 102012004018 A1), published Sep. 20, 2012, machine translation to English (Year: 2012).*
(Continued)

*Primary Examiner* — Galen H Hauth
*Assistant Examiner* — Lawrence D. Hohenbrink, Jr.
(74) *Attorney, Agent, or Firm* — KARCESKI IP LAW, PLLC (57) ABSTRACT

An injection molding machine includes: a mold clamping unit; an injection unit; and a safety cover that surrounds the mold clamping unit and the injection unit. The safety cover includes a detachable panel that is attached to an opening. The safety cover includes a door portion that moves between a position where the door portion blocks a second portion of the opening and a position where the door portion does not cover the opening. The safety cover has a size that is smaller than the opening but greater than the second portion. A detachable panel has a first stopper that restricts an opening motion of the door portion when only the second portion is open. The safety cover is provided with a second stopper that restricts the opening motion of the door portion when the opening is entirely open and the detachable panel is removed.

5 Claims, 7 Drawing Sheets

(58) Field of Classification Search
USPC .......................................................... 425/151
See application file for complete search history.

(56) References Cited

FOREIGN PATENT DOCUMENTS

| | | | |
|---|---|---|---|
| CN | 210283146 U | 4/2020 | |
| CN | 212331753 U | 1/2021 | |
| DE | 102012004018 A1 * | 9/2012 | ............. B22D 17/20 |
| DE | 102017004530 A1 | 11/2017 | |
| JP | H052935 U | 1/1993 | |
| JP | H06297534 A | 10/1994 | |
| JP | H10296783 A | 11/1998 | |
| JP | 2002028949 A | 1/2002 | |
| JP | 2002036326 A | 2/2002 | |
| JP | 2003276071 A | 9/2003 | |
| JP | 2013094990 A | 5/2013 | |
| JP | 2018030302 A | 3/2018 | |
| JP | 2019010746 A | 1/2019 | |
| JP | 2020006633 A | 1/2020 | |

OTHER PUBLICATIONS

Hong et al. (CN 110884038 A), published Mar. 17, 2020, machine translation to English (Year: 2020).*
Huber et al. (DE 102012004018 A1), published Sep. 20, 2012, Fig. 4 only (Year: 2012).*
Huber et al. (DE 102012004018 A1), published Sep. 20, 2012, Fig. 8 only (Year: 2012).*
German Office Action dated May 21, 2024, for German Patent Application No. 112021002741.7.
International Search Report dated Sep. 7, 2021, for International Patent Application No. PCT/JP2021/028567.
Chinese Office Action dated Feb. 24, 2025, for Chinese Patent Application No. 202180048274.6.

* cited by examiner

INJECTION MOLDING MACHINE

CROSS-REFERENCE TO RELATED APPLICATION(S)

This is a National Stage Entry into the United States Patent and Trademark Office from International Patent Application No. PCT/JP2021/028567, filed on Aug. 2, 2021, which relies on and claims priority to Japanese Patent Application No. 2020-133032, filed on Aug. 5, 2020, the entire contents of both of which are incorporated herein by reference.

FIELD OF THE INVENTION

The present disclosure relates to an injection molding machine.

BACKGROUND OF THE INVENTION

There is a known injection molding machine including: a cover that covers the areas surrounding a mold clamping device and an injection device; an opening provided in the cover; and a safety door that opens and closes the opening and that is supported so as to be slidable in an opening/closing direction of a mold in the mold clamping device (for example, see Japanese Unexamined Patent Application, Publication No. 2020-6633).

When performing maintenance work of the mold clamping device and the injection device, a portion of the mold clamping device or the injection device disposed on an inner side of the cover is exposed to the exterior by opening the opening by sliding the safety door.

SUMMARY OF THE INVENTION

An aspect of the present disclosure is an injection molding machine including: a mold clamping unit that opens and closes a mold; an injection unit that injects a molding material into the mold; and a safety cover that surrounds the mold clamping unit and the injection unit, wherein the safety cover includes a detachable panel that is attached, in an attachable/detachable manner, to an opening from which at least one of the mold clamping unit and the injection unit is exposed to an exterior and that blocks a first portion, which is a portion of the opening in a width direction thereof, and a door portion that is supported so as to be movable, along the width direction of the opening, between a position at which the door portion blocks a second portion, which is a remaining portion of the opening, and a position at which the door portion does not cover the opening, and that has a size that is smaller than the opening and greater than the second portion, the detachable panel has a first stopper that restricts a movement of the door portion in an opening direction as a result of the door portion abutting against the first stopper at a position at which only the second portion is open, and the safety cover is provided with a second stopper that restricts the movement of the door portion in the opening direction as a result of the door portion abutting against the second stopper at a position at which the first portion and the second portion are open in a state in which the detachable panel is removed.

DESCRIPTION OF EMBODIMENT(S) OF THE INVENTION

An injection molding machine 1 according to an embodiment of the present disclosure will be described below with reference to the drawings.

Figure 1:
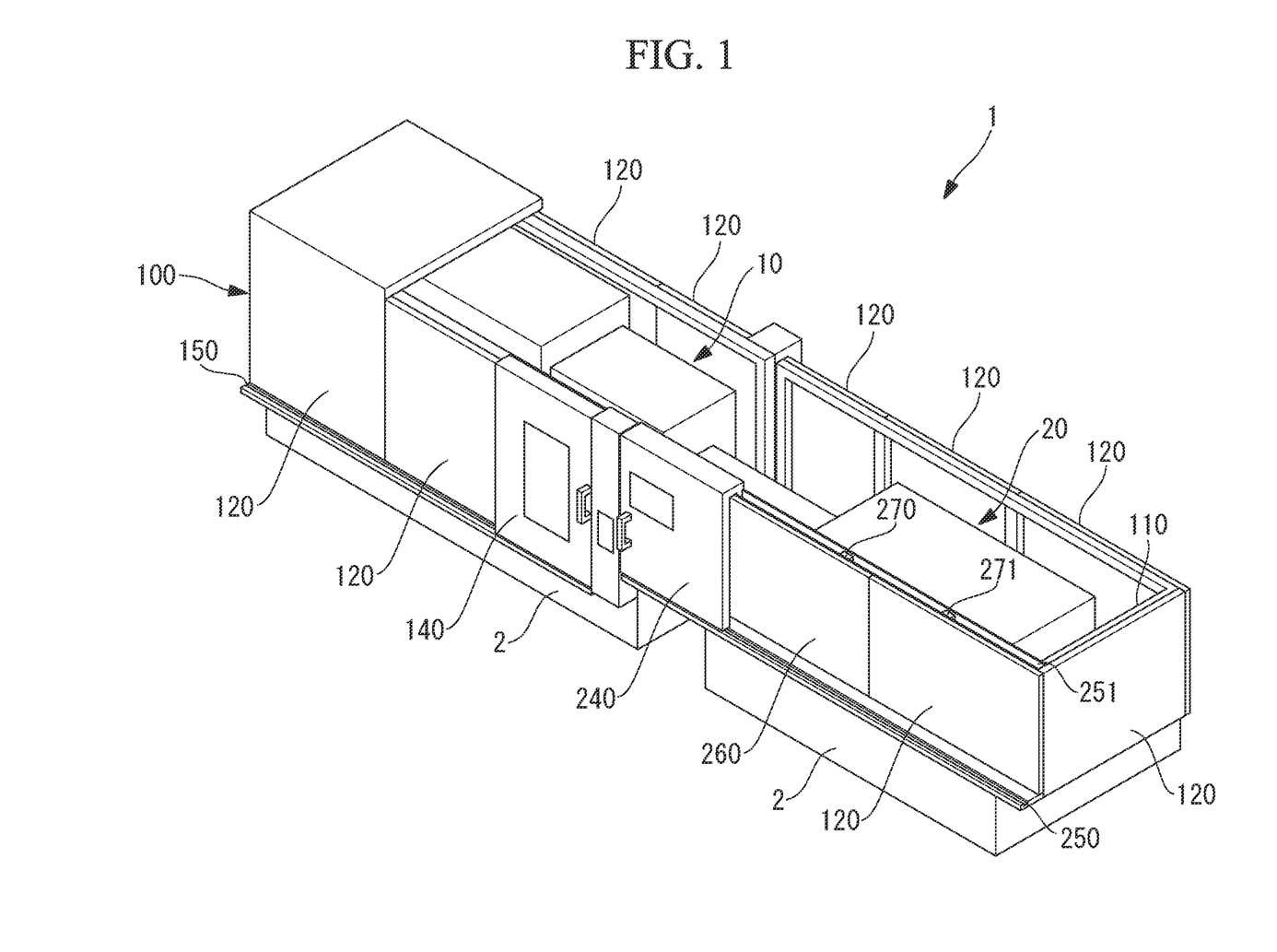
FIG. 1 is an overall configuration diagram of an injection molding machine according to an embodiment of the present disclosure.

As shown in FIG. 1, the injection molding machine 1 according to this embodiment includes a mold clamping unit 10, an injection unit 20, and a safety cover 100 that surrounds the mold clamping unit 10 and the injection unit 20 around the entire perimeters thereof.

The mold clamping unit 10, the injection unit 20, and the safety cover 100 are respectively secured to a base 2 installed on a horizontal floor surface.

The mold clamping unit 10 includes a mold and a mold clamping device that opens and closes the mold.

The injection unit 20 includes: a cylinder in which a molding material is melted; a nozzle from which the melted molding material is injected into the mold; and a supply device that supplies the molding material to the cylinder.

Figure 2:
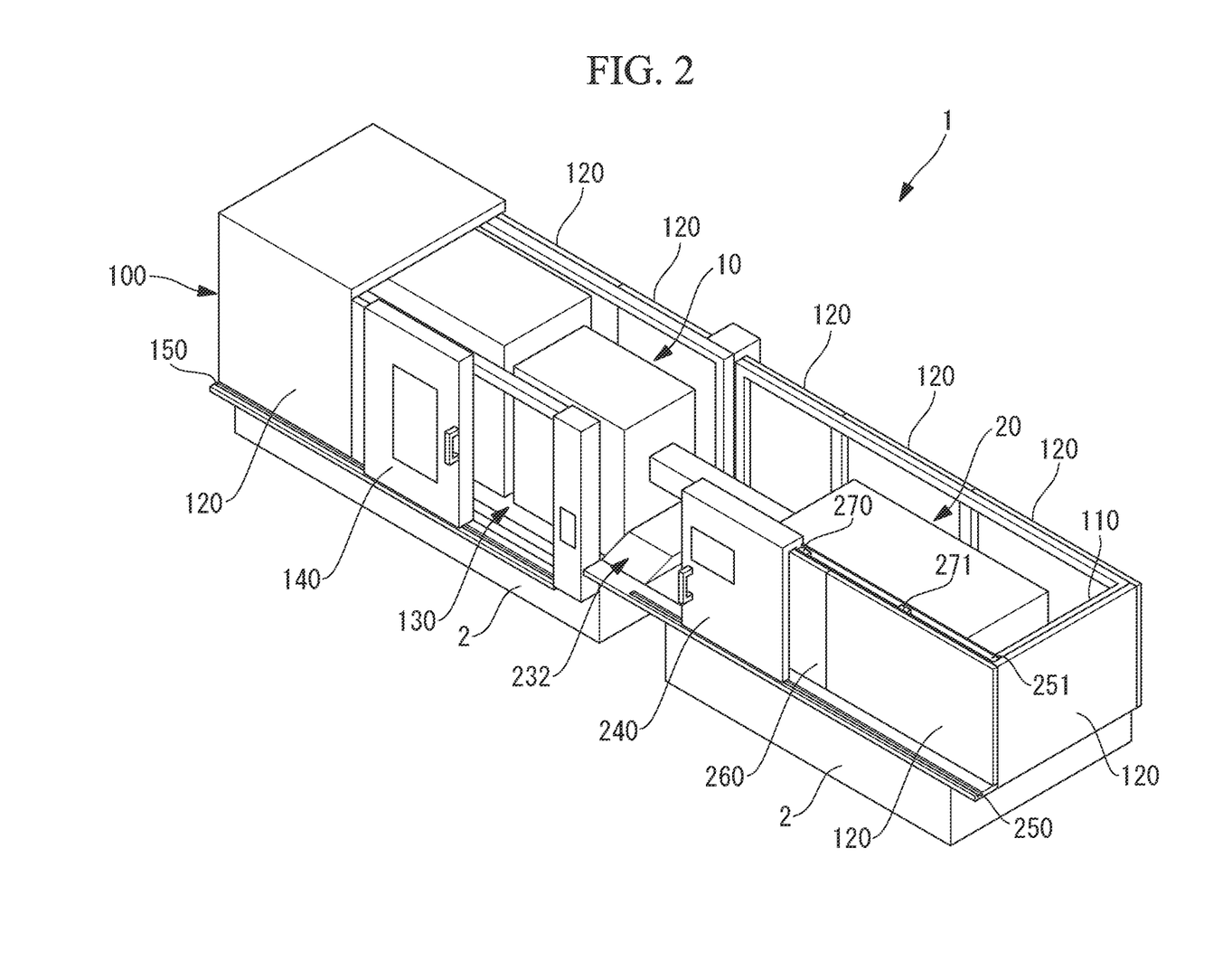
FIG. 2 is an overall configuration diagram of the injection molding machine in FIG. 1, showing a state in which an opening on a mold clamping unit side and a second portion of an opening on an injection unit side are open.
Figure 3:
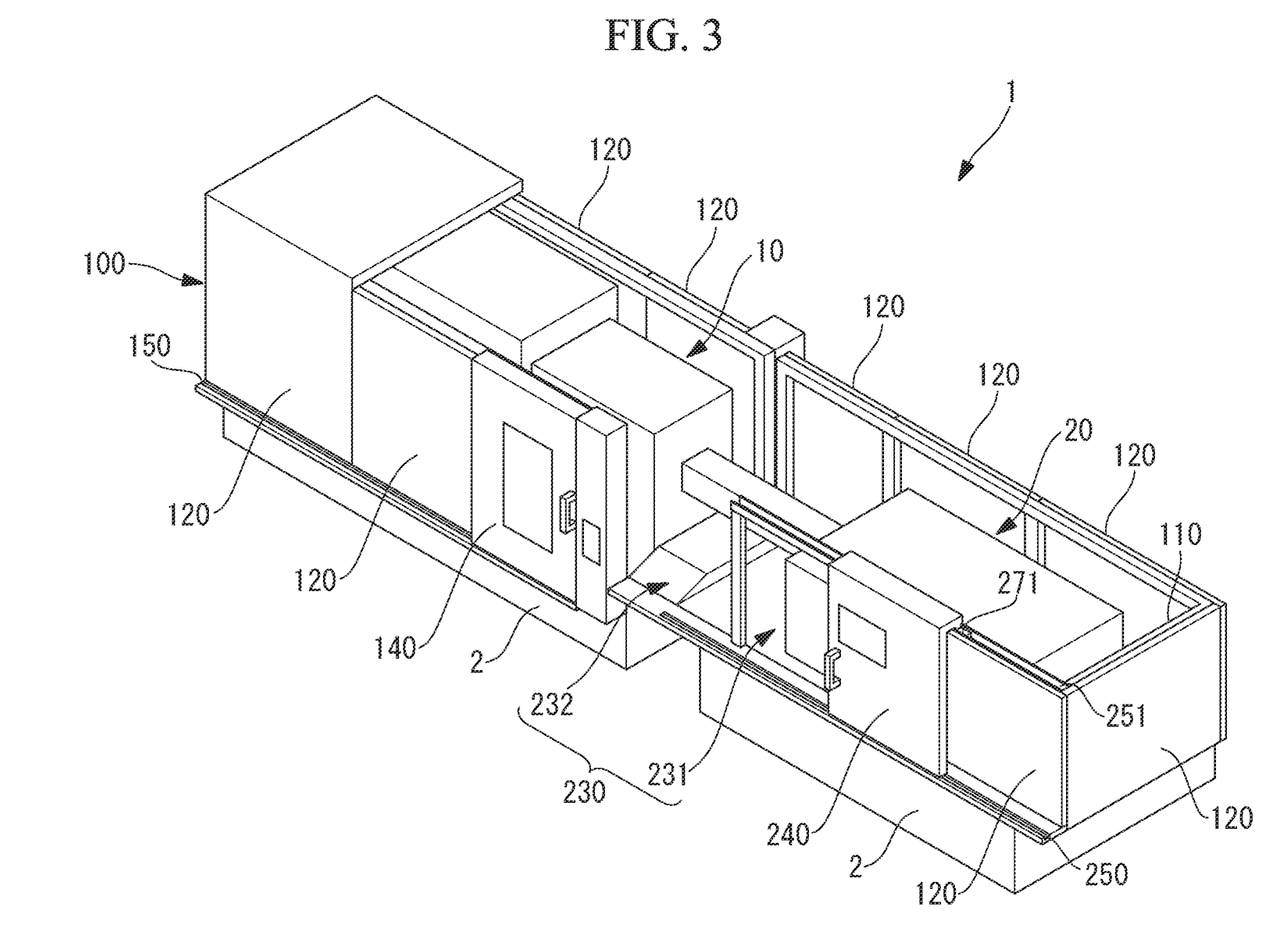
FIG. 3 is an overall configuration diagram of the injection molding machine in FIG. 1, showing a state in which a first portion and the second portion of the opening on the injection unit side are open.

As shown in FIGS. 1-3, the safety cover 100 includes: a frame 110 that is disposed at a position at which the frame 110 surrounds the mold clamping unit 10 and the injection unit 20; and a plurality of secured panels 120 that are secured to the frame 110. At a side of the mold clamping unit 10, an opening 130 at which the secured panel 120 is not secured so as to be open to expose a portion of the mold clamping unit 10 to the exterior is provided. The safety cover 100 includes a safety door 140 that blocks the opening 130 in an openable/closable manner.

A rail 150 that horizontally extends along the width direction of the opening 130 is secured to the frame 110. The safety door 140 is supported by rollers (not shown) that roll on the rail 150 so as to be movable along the longitudinal direction of the rail 150.

Furthermore, at a side of the injection unit 20, an opening 230 at which the secured panel 120 is not secured so as to be open to expose a portion of the injection unit 20 to the exterior is provided. The safety cover 100 includes: a detachable panel 260 that is attached to the frame 110 in an attachable/detachable manner at a position at which a first portion 231, which is a portion of the opening 230 in the width direction thereof, is blocked; and a safety door (door portion) 240 that blocks a second portion 232, which is the remaining portion of the opening 230 in the width direction in an openable/closable manner.

In the frame 110, rails 250 and 251 that horizontally extend along the width direction of the opening 230 are respectively secured at the top and the bottom of the opening 230. The rails 250 and 251 both extend outward on one side in the width direction of the opening 230 so as to protrude farther out than the width dimension of the safety door 240.

The safety door 240 is supported by rollers (not shown) that roll on the rails 250 and 251 so as to be movable along the longitudinal directions of the rails 250 and 251.

Figure 4:
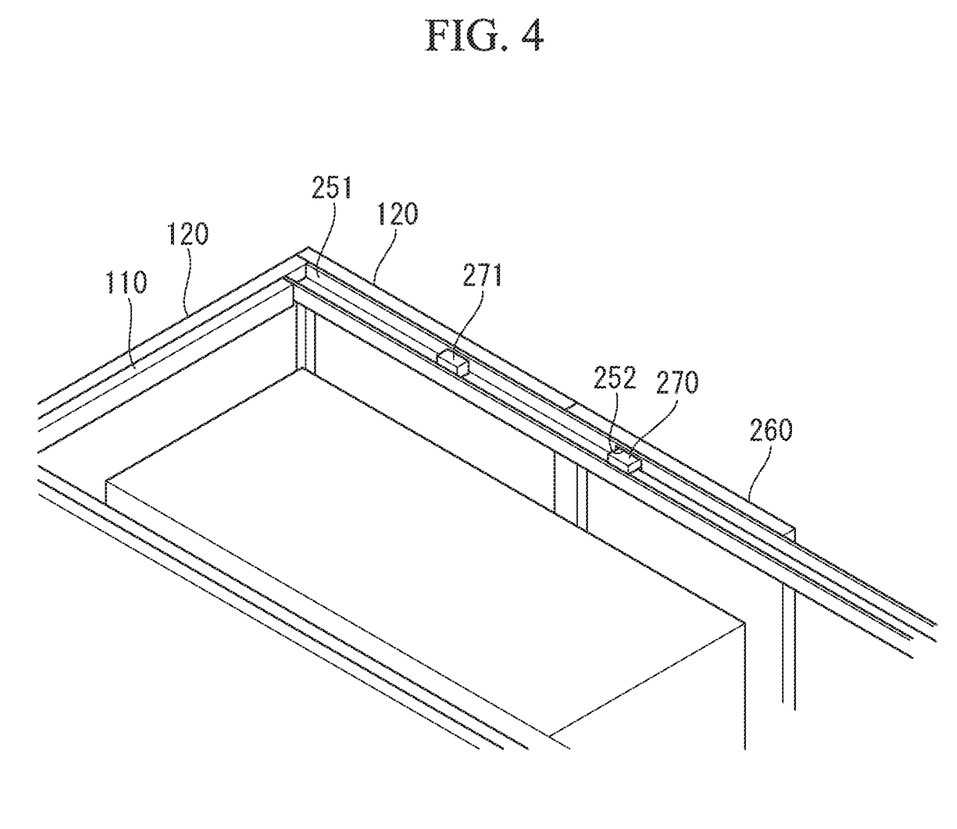
FIG. 4 is an enlarged perspective view of the injection molding machine in FIG. 1, showing a state in which a detachable panel is attached.
Figure 5:
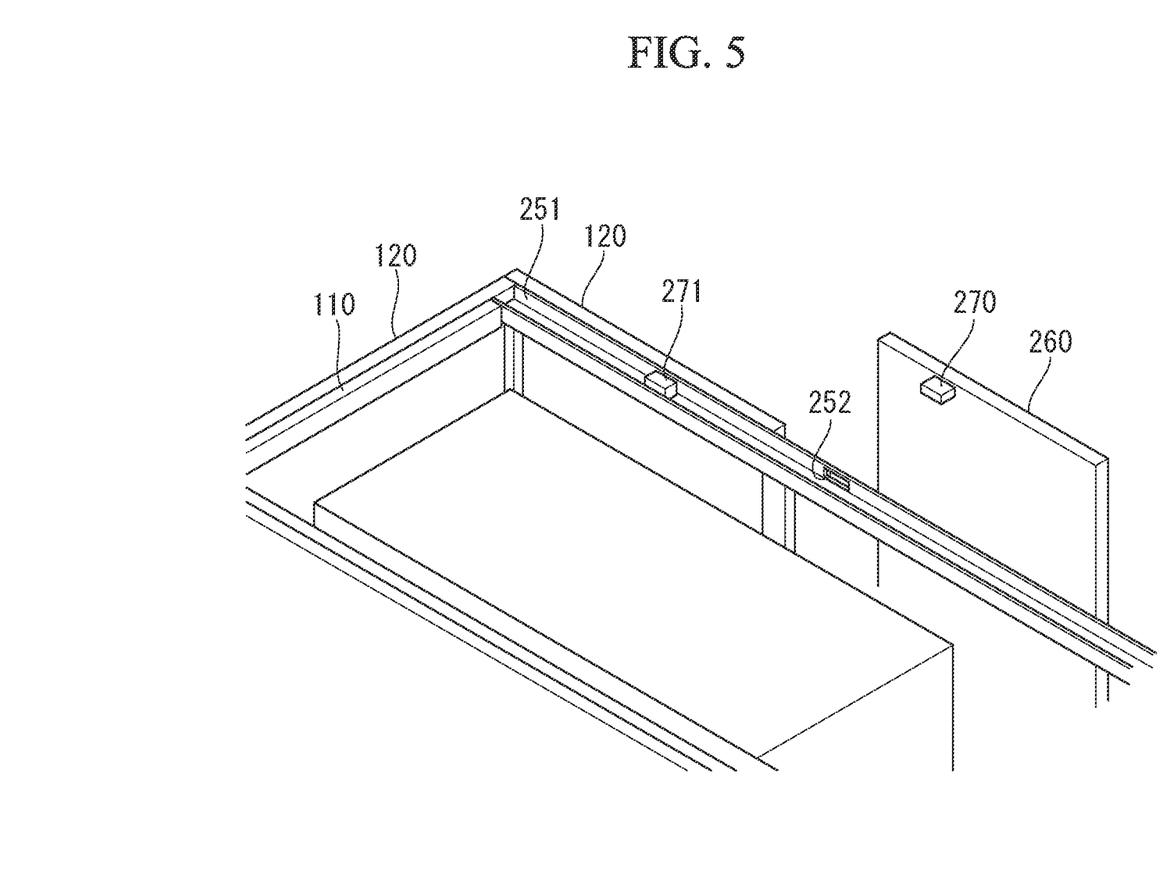
FIG. 5 is an enlarged perspective view of the injection molding machine in FIG. 1, showing a state in which the detachable panel is removed.

In addition, as shown in FIGS. 4 and 5, the frame 110 is provided with a through-hole 252 that opens at a side of the rail 251.

As shown in FIGS. 2 and 4, the detachable panel 260 includes a first stopper 270 that is disposed on the rail 251 in a state in which the detachable panel 260 is attached at the position at which said panel blocks the first portion 231.

When the detachable panel 260 is attached to the frame 110 from a side of the rail 251, the first stopper 270 passes through the through-hole 252 and is disposed on the rail 251.

As a result of the safety door 240 that has moved to a position at which the second portion 232 of the opening 230 is fully open abutting against the first stopper 270, the first stopper 270 restricts further movement of the safety door 240 in the opening direction.

In other words, in the state in which the detachable panel 260 is attached, the safety door 240 is capable of opening and closing the second portion 232 of the opening 230 and, at the position at which the second portion 232 is fully open, the first stopper 270 restricts further opening motion.

In contrast, when the detachable panel 260 is removed, the first stopper 270 is removed from the rail 251 together with the detachable panel 260; therefore, the safety door 240 is in a state in which the safety door 240 can move farther beyond the position at which the second portion 232 is fully open.

As shown in FIGS. 3 and 5, a second stopper 271 is secured on the rail 251.

In the state in which the detachable panel 260 is removed, as a result of the safety door 240 that has moved to the position at which the opening 230 is fully open abutting against the second stopper 271, the second stopper 271 restricts further movement of the safety door 240 in the opening direction.

In other words, in the state in which the detachable panel 260 is removed, the second stopper 271 restricts further opening motion of the safety door 240 at the position at which the opening 230 is fully open.

The operation of the thus-configured injection molding machine 1 according to this embodiment will be described below.

In the case in which injection molding is performed by using the injection molding machine 1, the detachable panel 260 is attached to the first portion 231 of the opening 230 of the safety cover 100. Then, the opening 130 is blocked by the safety door 140 and the second portion 232 of the opening 230 is blocked by the safety door 240. Accordingly, as shown in FIG. 1, the outer perimeters of the mold clamping unit 10 and the injection unit 20 are surrounded by the safety cover 100 around the entire perimeters thereof.

In order to perform work required when performing injection molding, such as removing a molded product from the injection molding machine 1, etc., a portion of the mold clamping unit 10 or the injection unit 20 is exposed to the exterior by opening the opening 130 or 230 by means of the safety door 140 or 240, as shown in FIG. 2.

Figure 6:
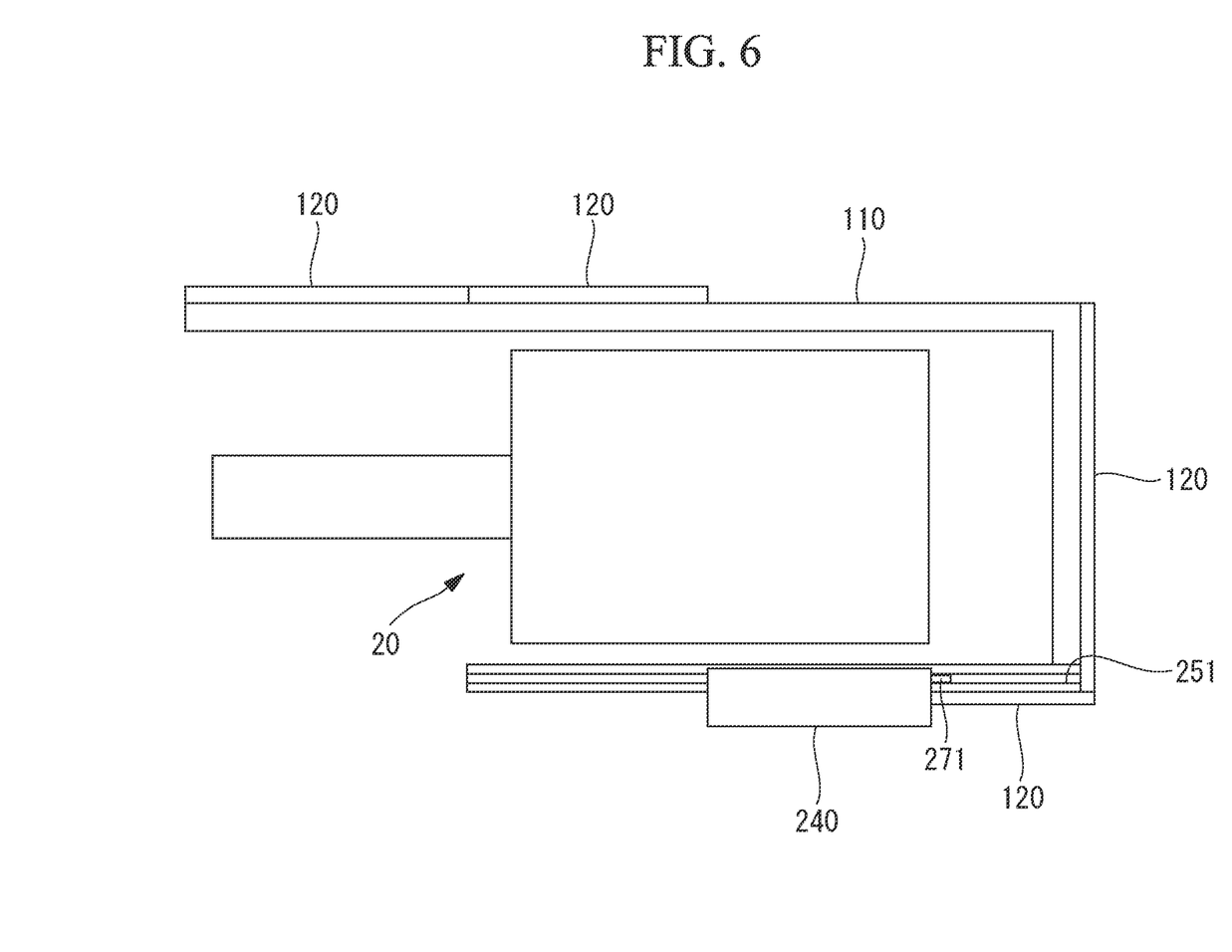
FIG. 6 is an enlarged top view of the injection molding machine in FIG. 3, showing a state in which one secured panel is removed.

On the other hand, in the case in which maintenance work, such as cleaning or replacing the injection unit 20, etc., is performed, the detachable panel 260 is removed from the frame 110 to open the first portion 231 of the opening 230, as shown in FIGS. 3 and 6. Subsequently, the safety door 240 is moved to the position at which the safety door 240 abuts against the second stopper 271 to achieve the state in which the opening 230 is fully open.

Figure 7:
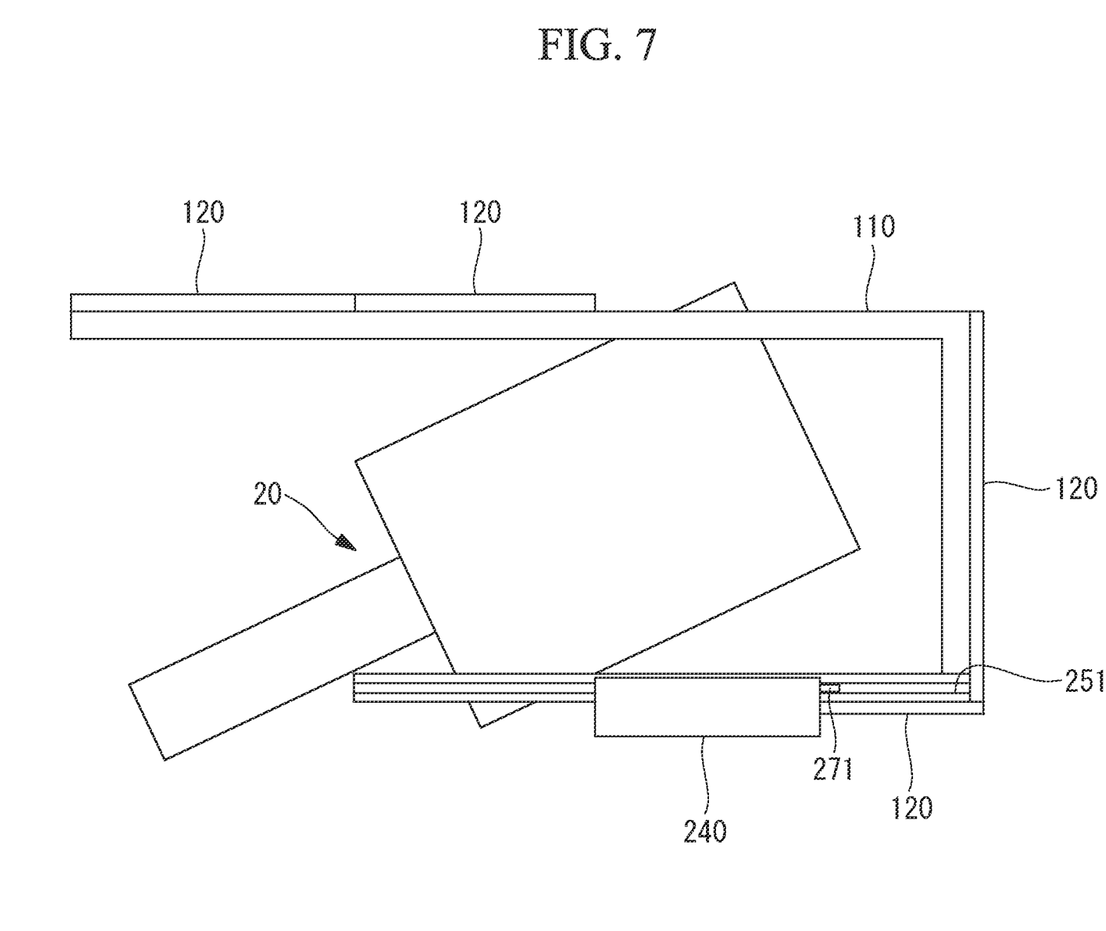
FIG. 7 is an enlarged top view showing a state in which an injection unit of the injection molding machine in FIG. 6 is rotated.

In this state, as shown in FIG. 7, it is possible to bring a maintenance site of the injection unit 20 close to the opening 230 by rotating the injection unit 20 about a prescribed axis extending in the vertical direction, and thus, it is possible to expose the maintenance site by a large amount.

At this time, if there are secured panels 120 that hinder the rotation of the injection unit 20, such panels may be removed.

As has been described above, with the injection molding machine 1 according to this embodiment, during injection molding work, it is possible to suppress the opening area of the opening 230 to the second portion 232, which corresponds to the minimum necessary opening area, and it is also possible to suppress the width dimension of the safety door 240 to the minimum necessary size for opening and closing the second portion 232. Also, during maintenance, it is possible to expose the injection unit 20 by a large amount by opening the first portion 231 and the second portion 232 by removing the detachable panel 260, and thus, it is possible to enhance the ease of performing maintenance work.

In addition, in this embodiment, because the first stopper 270 and the second stopper 271 are disposed on the same straight line along the movement direction of the safety door 240, it is possible to make the same portion of the safety door 240 abut against the first stopper 270 and the second stopper 271.

Accordingly, it is possible to limit the number of portions to be reinforced against collisions with both the stoppers 270 and 271, and thus, there is an advantage in that it is possible to simplify the structure of the safety door 240.

Furthermore, as a result of covering areas laterally outside the rail 251, on which the stoppers 270 and 271 both are disposed, with the detachable panel 260 and the secured panels 120, it is possible to dispose both the stoppers 270 and 271 at positions that are difficult for an operator to reach.

Therefore, there is an advantage in that it is possible to prevent the operator from erroneously removing the first stopper 270 or the second stopper 271.

Note that, in this embodiment, the detachable panel 260 is disposed at the position at which said panel blocks a portion of the opening 230 in the width direction thereof on the injection unit 20 side; however, alternatively or additionally, the detachable panel 260 may be provided at a position at which said panel blocks a portion of the opening 130 in the width direction thereof on the mold clamping unit 10 side.

Accordingly, regarding the safety door 140 also, it is possible to expose the mold clamping unit 10 even more when performing maintenance work on the mold clamping unit 10, without increasing the width dimension of the safety door 140.

Therefore, it is possible to achieve both prevention of deterioration in the operability of the safety door 140 and an improvement in maintenance work efficiency with respect to the mold clamping unit 10.

In addition, in this embodiment, just one detachable panel 260, which blocks the portion of the opening 230 in the width direction thereof, is provided; however, alternatively, a plurality of detachable panels 260 that are disposed adjacent to each other along the width direction of the opening 230 may be provided.

In this case, by changing the number of the detachable panels 260 removed from the frame 110 in accordance with the specifics of work to be performed on the injection unit 20, it is possible to change, in a stepwise manner, the area to be opened in the width dimension of the first portion 231.

Therefore, it is possible to adjust the area to be opened in the opening 230 in accordance with the specifics of work to be performed on the injection unit 20, and thus, there is an advantage in that it is possible to further enhance the work efficiency during maintenance of the injection unit 20.

In addition, in this embodiment, the first stopper 270 and the second stopper 271 are disposed on the rail 251. The positions of both the stoppers 270 and 271 are not limited thereto, and the stoppers 270 and 271 may be disposed at arbitrary positions so long as it is possible to restrict the opening motion of the safety door 240 at the positions at which the second portion 232 and the opening 230 are fully open.

In this case also, by setting both the stoppers 270 and 271 at positions that an operator cannot easily reach, it is possible to prevent the operator from erroneously removing both the stoppers 270 and 271.

The invention claimed is:

1. An injection molding machine comprising:
    a mold clamping unit that opens and closes a mold;
    an injection unit that injects a molding material into the mold; and
    a safety cover that surrounds the mold clamping unit and the injection unit,
    wherein the safety cover includes a removable panel that is attached so as to be removable from or attachable to a structure surrounding an opening from which at least one of the mold clamping unit and the injection unit is exposed to an exterior and that blocks a first portion, which is a portion of the opening in a width direction thereof, and a door portion that is supported so as to be movable, along the width direction of the opening, between a first position at which the door portion blocks a second portion, which is a remaining portion of the opening, and a third position at which the door portion does not cover the opening, and that has a size that is smaller than the opening and greater than the second portion,
    the removable panel has a first stopper that restricts a movement of the door portion in an opening direction as a result of the door portion abutting against the first stopper at a second position at which only the second portion is open, and
    the safety cover is provided with a second stopper that restricts the movement of the door portion in the opening direction as a result of the door portion abutting against the second stopper at the third position at which the first portion and the second portion are open in a state in which the first stopper together with the removable panel is removed.

2. The injection molding machine according to claim 1, wherein the opening is provided at a position at which the injection unit is exposed to the exterior.

3. The injection molding machine according to claim 1, wherein the opening is provided at a position at which the mold clamping unit is exposed to the exterior.

4. The injection molding machine according to claim 1, wherein the first stopper and the second stopper are disposed on a same straight line extending in the width direction of the opening in a state in which the removable panel is attached.

5. The injection molding machine according to claim 1, wherein the removable panel comprises a plurality of removable panels.

* * * * *